(12) United States Patent
Kato et al.

(10) Patent No.: US 10,562,142 B2
(45) Date of Patent: Feb. 18, 2020

(54) PALLET CHANGING APPARATUS

(71) Applicant: Matsuura Machinery Corporation, Fukui, Fukui (JP)

(72) Inventors: Toshihiko Kato, Fukui (JP); Takashi Tameto, Fukui (JP); Kyusuke Horiguchi, Fukui (JP)

(73) Assignee: Matsuura Machinery Corporation, Fukui, Fukui (JP)

( * ) Notice: Subject to any disclaimer, the term of this patent is extended or adjusted under 35 U.S.C. 154(b) by 0 days.

(21) Appl. No.: 16/152,738

(22) Filed: Oct. 5, 2018

(65) Prior Publication Data

US 2019/0118321 A1    Apr. 25, 2019

(30) Foreign Application Priority Data

Oct. 20, 2017    (JP) .................... 2017-203627

(51) Int. Cl.
    *B23Q 7/14* (2006.01)
    *B23Q 11/08* (2006.01)
    *B23Q 1/48* (2006.01)

(52) U.S. Cl.
    CPC .......... *B23Q 7/1431* (2013.01); *B23Q 7/1494* (2013.01); *B23Q 11/08* (2013.01); *B23Q 1/488* (2013.01); *B23Q 1/4876* (2013.01); *Y10T 29/5196* (2015.01); *Y10T 409/30392* (2015.01); *Y10T 409/305768* (2015.01); *Y10T 409/305824* (2015.01)

(58) Field of Classification Search
CPC ............. Y10T 29/5124; Y10T 29/5196; Y10T 409/30392; Y10T 409/30532; Y10T 409/305432; Y10T 409/409; Y10T 409/306048; Y10T 409/306104; Y10T 483/16; Y10T 483/165; B23Q 1/66; B23Q 7/1426; B23Q 7/1431
USPC ......... 29/33 P, 563; 409/134, 159, 161, 172, 409/173; 483/14, 15; 74/608, 609
See application file for complete search history.

(56) References Cited

U.S. PATENT DOCUMENTS

| | | | | |
|---|---|---|---|---|
| 4,797,052 | A * | 1/1989 | Ohta | B23Q 7/1431 198/346.1 |
| 7,013,544 | B2 * | 3/2006 | Yasuda | B23Q 7/1431 29/27 C |
| 8,640,313 | B2 * | 2/2014 | Horn | B23Q 7/1431 198/346.1 |

(Continued)

FOREIGN PATENT DOCUMENTS

| | | | | |
|---|---|---|---|---|
| DE | 102009040597 A1 * | 4/2010 | ........... | B23Q 7/1431 |
| JP | 2000117579 A * | 4/2000 | | |

(Continued)

*Primary Examiner* — Erica E Cadugan
*Assistant Examiner* — Michael Vitale
(74) *Attorney, Agent, or Firm* — Richard M. Goldberg (57) ABSTRACT

A pallet changing apparatus which adopts a table 4 that is able to move back and forth in relation to a turning shaft 1 and has a oscillating portion 41 for placing workpieces W, W' by way of pallets P, P' so as to oscillate freely by a rising portion 42 at the leading end of the table, and a bridging extending portion 31 which bridges a supporting portion of pallet P or P' in a pallet changing arm 3 with both sides of the turning shaft 1 forming a shape of covering across the upper side of the rising portion 42 at a stage of the table 4 transferring pallet P.

13 Claims, 7 Drawing Sheets

(56) References Cited

U.S. PATENT DOCUMENTS

2015/0298272 A1* 10/2015 Murata ................ B23Q 7/1431
414/222.07

FOREIGN PATENT DOCUMENTS

| | | | |
|---|---|---|---|
| JP | 2004-160601 A | 6/2004 | |
| JP | 2004276162 A * | 10/2004 | |
| JP | 2007319951 A * | 12/2007 | ........... B23Q 1/4852 |
| JP | 2015-205356 A | 11/2015 | |
| WO | WO-2013038568 A1 * | 3/2013 | ............... B23Q 1/66 |
| WO | WO-2014180903 A1 * | 11/2014 | ............... B23Q 1/25 |
| WO | 2015/177906 A1 | 11/2015 | |

* cited by examiner

PALLET CHANGING APPARATUS

TECHNICAL FIELD

This invention relates to a pallet changing apparatus which arranges a turning shaft for supporting a pallet changing arm transferring a pallet between a pallet setup base and a table in such a manner so as to move freely in a vertical direction and also in a state of being stationary in a horizontal direction.

BACKGROUND OF THE INVENTION

The pallet changing apparatus equips, as essential constituents, the pallet setup base which places the pallet, the table which places a workpiece with a state of before processing or after processed by means of the pallet, and the turning shaft which holds pallet changing arms extended on both sides and also turns along a horizontal direction together with the pallet changing arms.

The turning shaft equips a turning supporting portion which allows a ball bearing device, etc., to turn smoothly below a site which supports the pallet changing arm. In recent years, there is favorably adopted such a configuration that has a covering portion which covers across the upper side of a turning supporting portion in order to prevent chips generated due to cutting of workpieces by a main shaft from entering into the turning supporting portion.

On the other hand, for the sake of convenience of cutting work by the main shaft, the table often equips a rising portion which has an oscillating center axis at a leading end of the table on the side of the turning shaft for allowing a region which places a workpiece by means of a pallet to oscillate freely and also equips an oscillating portion in which the region is supported by the turning shaft.

Where the table having the above-described rising portion moves back from and forth for a side of the turning shaft having the covering portion, the presence of the rising portion inevitably hinders the turning of the pallet changing arm.

Further, the fact that a certain space is occupied by the turning shaft firmly fixing the covering portion makes it worse since the above-mentioned is necessary for hindering the problem.

Figure 7:
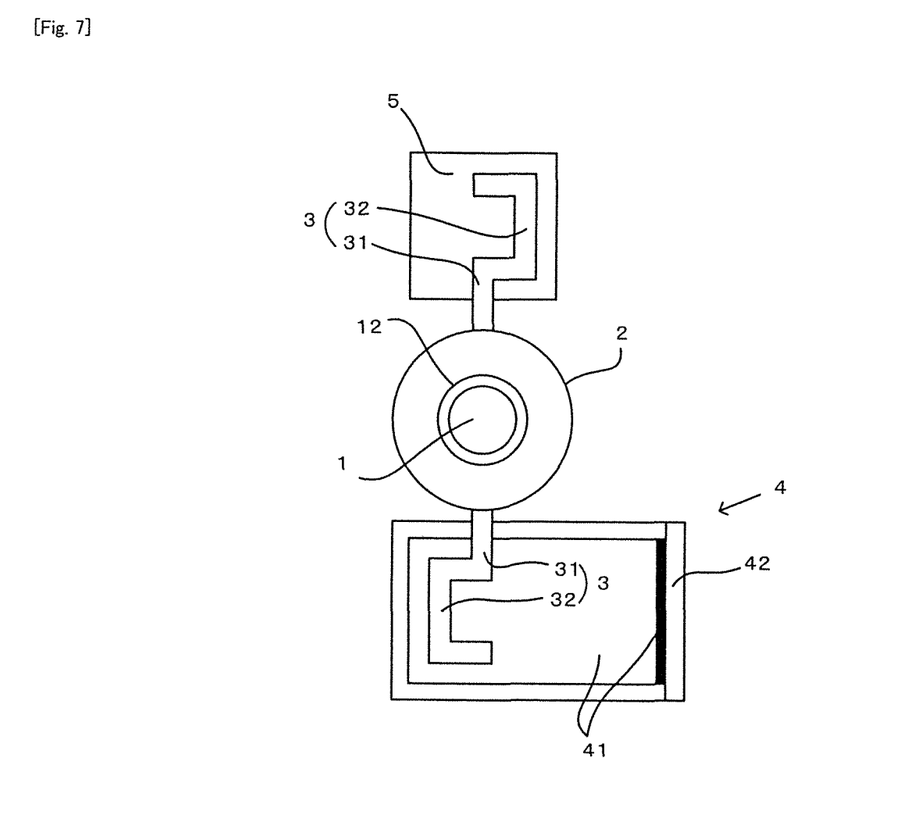
FIG. 7 is a top view which shows a state that the turning shaft and the pallet setup base are arranged in a direction which is orthogonal to a direction at which the table moves back and forth.

In order to avoid the above-described problem, instead of the table which has the rising portion and moves back from and forth for a side of the turning shaft, there can be conceived such a configuration that, as shown in FIG. 7, a turning shaft 1 which firmly fixes a covering portion 2 is arranged at a side portion in a direction at which a table 4 which has an oscillating portion 41 and a rising portion 42 at the leading end side of the table moves back and forth, a pallet setup base 5 is arranged at a side portion further away from the table 4, and also the direction at which the table 4 moves back and forth is orthogonal to a direction at which the turning shaft 1 and the setup base 5 are arranged.

However, in the case of the configuration of the above-described arrangement, in addition to a space region in a direction at which the table 4 moves back and forth, a space region is also necessary at the side portion for changing a pallet. Thereby, it is impossible to achieve a compact pallet changing apparatus.

Where the configuration in which the table moves back from and forth for a side of the turning shaft is compared with the above-described configuration in which the constituents are arranged at the side portions, there is found such a relationship that the former configuration is larger in a region in which the table overlaps with the pallet changing arm in a vertical direction than the latter configuration. In the former configuration, it is possible to set the space necessary for turning of the pallet changing arm small.

Instead of the configuration in which the constituents are arranged at the side portions, where there is retained the configuration in which the table having the rising portion and the oscillating portion moves back from and forth for a side of the turning shaft, it is possible to conceive such a configuration that, on transfer of a pallet by using a table and a setup base, a turning shaft moves from an intermediate position between the table and the setup base to a position suitable for the transfer.

However, in the case of the above-described configuration, it is essential that not only the table moves back and forth but also the turning shaft moves. Therefore, complicated control becomes essential.

With regard to a pallet changing apparatus, various publicly-known technologies have been disclosed.

Of these publicly known technologies, in Patent Document 1, an oscillatory table 6 is moved by a table-driving device 30. However, a supporting shaft 42 which corresponds to the turning shaft is arranged at an oblique side portion in a direction at which the table 6 moves (FIGS. 1,3,4: the supporting shaft 42 is not provided with a covering portion).

However, as compared with the case of the orthogonal state shown in FIG. 5, the configuration of the above arrangement is such that a space region of the side portion necessary for changing a pallet is slightly smaller. This configuration is also unable to achieve a compact pallet changing apparatus.

In Patent Document 2, a turning member 34 which corresponds to the pallet changing arm is installed on a side of a table 6 which can oscillate along an oscillating axis 19 provided at a supporting portion 17 which corresponds to the rising portion, and also one of or both of the table 6 and a turning member 34 are allowed to move back and forth with each other (FIG. 2 and claim 1: the turning member 34 is not provided with a covering portion).

However, the above-described configuration is also similar to the configuration shown in FIG. 5 and the configuration described in Patent Document 1 in that it is unable to achieve a compact pallet changing apparatus.

Additionally, in the case of the above-described configuration, the table 6 is not only required to move back from and forth for a side of a lower region of the main shaft, but the turning member 34 and/or the table 6 are required to move back and forth with each other in a direction different from the above-described back and forth movement. Therefore, complicated control is essential.

As described so far, although referring the publicly known technologies, proposal is not found for compact configuration of a pallet changing apparatus at all which supports a workpiece so as to oscillate by means of a pallet and which is provided with a rising portion having an oscillating center axis at the leading end of the turning shaft of the table which moves back from and forth for a side of the turning shaft and also covers across upper side of a turning supporting portion at a lower end of the turning shaft.

PRIOR ART DOCUMENTS

Patent Documents

[Patent Document 1] Japanese Published Unexamined Patent Application No. 2004-160601

[Patent Document 2] Japanese Published Unexamined Patent Application No. 2015-205356

SUMMARY OF INVENTION

Technical Problem

An object of the present invention is to provide a compact configuration of a pallet changing apparatus which equips a rising portion with an oscillating center axis at a leading end of the table that supports a workpiece by oscillatory state by means of a pallet and moves back from and forth for a side of the turning shaft.

Solution to Problem

In order to solve the above problem, a basic configuration of the invention is a pallet changing apparatus which equips a turning shaft for supporting a pallet changing arm transferring a pallet between a pallet setup base and a table in such a manner so as to move freely in a vertical direction and also in a state of being stationary in a horizontal direction, wherein the table moves back from and forth for a side of the turning shaft and also equips a rising portion at a leading end of the table on the side of the turning shaft and an oscillating portion which is supported by means of an oscillating center axis of the rising portion so as to oscillate freely and also places a workpiece by means of a pallet, wherein the turning shaft extends the pallet changing arms on both sides thereof, the pallet changing arm equips a bridging extending portion which bridges a pallet supporting portion extending in a horizontal direction for transferring a pallet at both sides, and the bridging extending portion forms a shape of covering across an upper side of the rising portion at a stage of the table transferring a pallet.

Advantageous Effects of Invention

The present invention which is based on the above basic configuration achieves a state that the bridging extending portion of each of the pallet changing arms extended on both sides of the turning shaft is arranged to cover across the upper side of the rising portion at a stage that the table transfers a pallet. Therefore, an existence of the rising portion does not correspond to an obstacle for turning of the pallet changing arms.

Further, in the case of adopting embodiment in which the rising portion positioned at the leading end of the table is arranged in the vicinity of the surface of the turning shaft at the above-described stage, it is possible to achieve a compact pallet changing apparatus by setting the length of the pallet changing arm shorter than the length compared with the case of the prior art.

BRIEF DESCRIPTION OF DRAWINGS

FIGS. 1(a) and 1(b) show a configuration of the basic configuration, wherein

FIGS. 2(a) and 2(b) show a configuration of an embodiment in which a turning shaft firmly fixes a covering portion and the covering portion is provided with an insertion and removal hole which allows a rising portion of a table to be inserted and removed freely, wherein

FIGS. 3(a) and 3(b) show a configuration of an embodiment in which a turning shaft is provided with a movable covering portion, a stationary covering portion is arranged below the movable covering portion and the stationary covering portion is provided with an insertion and removal hole which allows a rising portion of a table to be inserted and removed freely, wherein

FIGS. 4(a) and 4(b) show a configuration of an embodiment in which a turning shaft firmly fixes a covering portion, and a rising portion positioned at a leading end of a table and a lower supporting portion at a side of the rising portion form a detached state from the covering portion at a stage of transferring a pallet, wherein

FIGS. 5(a) and 5(b) show a configuration of an embodiment in which a turning shaft firmly fixes a movable covering portion, and a stationary covering portion is arranged on a floor below the movable covering portion, and a rising portion positioned at a leading end of a table and a lower supporting portion at the rising portion form a detached state from the movable covering portion and the stationary covering portion at the stage of transferring a pallet, wherein

DESCRIPTION OF EMBODIMENTS

As described in the Technical Field, the basic configuration shown in FIG. 1 stands on a technically basic premise that the table 4 moves back from and forth for a side of the turning shaft 1 and is also provided with the oscillating portion 41 which is supported so as to oscillate freely by means of an oscillating center axis 420 of the rising portion 42 positioned at the leading end of the table on the side of the turning shaft 1 and places workpieces W, W' by means of pallets P, P'.

In the basic configuration, the oscillating portion 41 which supports workpieces W, W' by means of the supporting frame 40 inside the table 4 and a supporting surface which supports the pallets P, P' by means of the supporting frame 50 inside the setup base 5 are both arranged so as to be lower than a position at which a supporting portion of the pallet changing arm 3 turns. Therefore, the supporting portion is arranged above the oscillating portion 41 and the supporting surfaces of the setup base 5.

As shown in FIG. 1, while the pallet changing arms 3 of the basic configuration are firmly fixed to the turning shaft 1 and extended on both sides, the supporting portions at the leading ends thereof turn to the positions below the pallets P, P' supported by the pallet supporting frames 40, 50 respectively and is also able to move to an upper region for the supporting surface of the oscillating portion 41 and the setup base 5 together with the turning shaft 1 in a state of supporting the pallets P, P'.

Figure 1A:
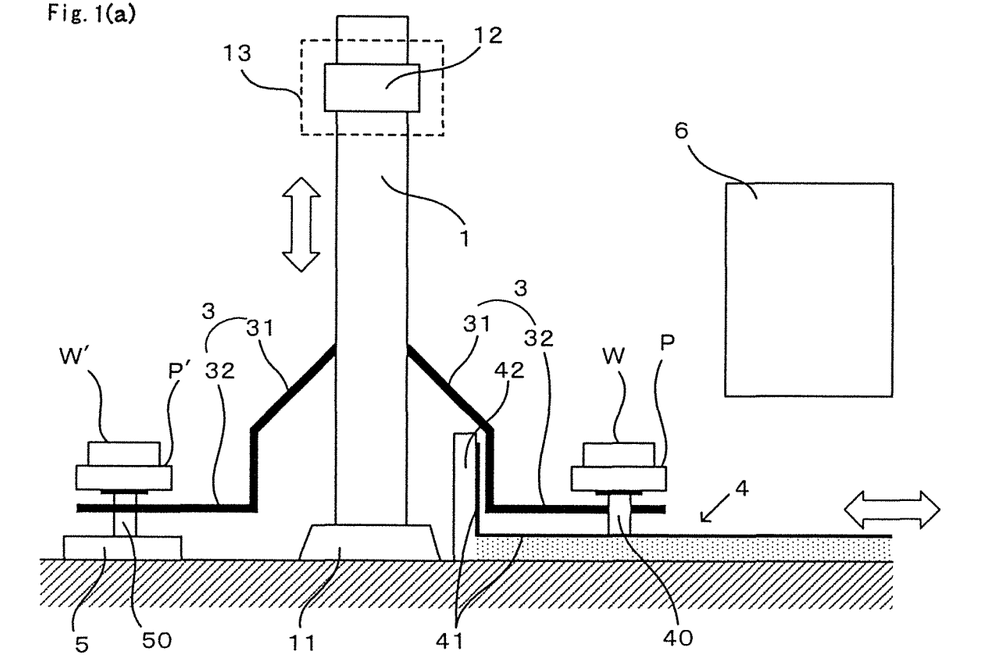
FIG. 1(a) shows a side sectional view thereof along a direction at which the table moves back and forth.

Then, as shown in FIG. 1(a), the pallet changing arms 3 of the basic configuration are each provided with a bridging extending portion 31 which bridges the pallet supporting portion 32 extending in a horizontal direction with the positions of both sides of the turning shaft 1, and the bridging extending portion 31 forms a shape of covering across the upper side of the rising portion 42 at a stage of the table 4 transferring pallets P, P'.

As a result, when the pallet changing arms 3 turn to the side of the table 4 on transferring pallets P, P', the presence of the rising portion 42 does not hinder the turning.

Figure 1B:
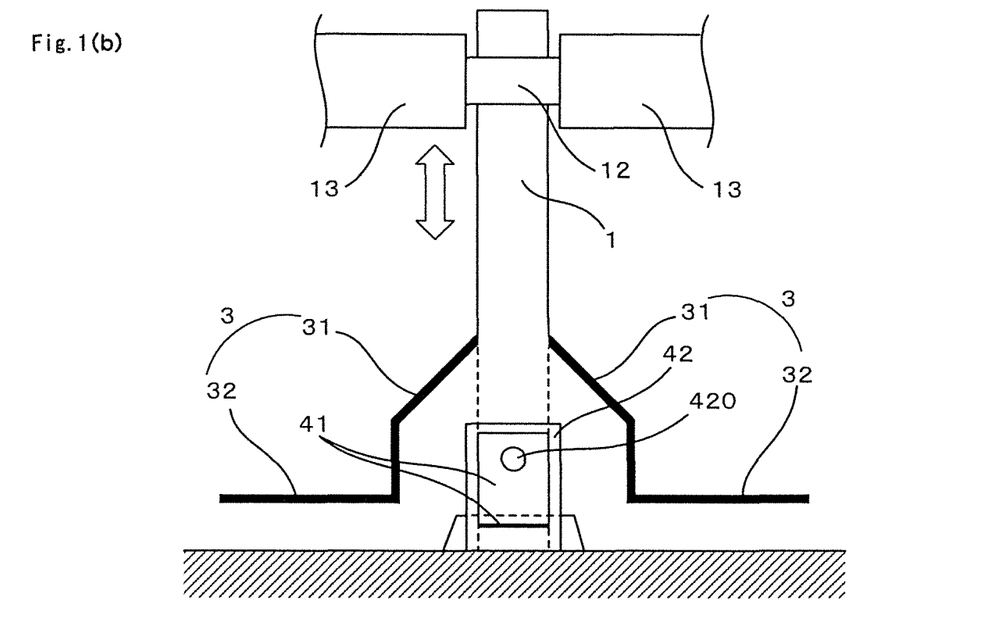
FIG. 1(b) shows a front view along a direction at which the table moves back and forth.

In FIG. 1(a), (b), the bridging extending portion 31 is extended obliquely from a side of the turning shaft 1 and forms approximately an L-letter shape. However, various shapes can be adopted as the bridging extending portion 31.

As shown in FIG. 2 and FIG. 4, for example, there can be adopted a shape in which the bridging extending portion 31 is extended in an obliquely linear manner from the side of the turning shaft 1 and reaches to the portion of supporting pallet P, P'. Further, as shown in FIG. 3 and FIG. 5, there can be adopted a shape in which the bridging extending portion 31 is extended from a side of the turning shaft 1 in a horizontal direction and sequentially curved and reaches to the portion of supporting pallet P, P'.

In the basic configuration, as shown in FIG. 1(a), (b), it is not necessarily required to cover a turning supporting portion 11 at a lower end portion of the turning shaft 1.

However, in a machine tool, as a result of cutting workpieces, with consideration given to flying chips, as shown in FIGS. 2, 3, 4, 5 and 6, a pallet changing apparatus is in most cases provided with the covering portion 2.

It is possible to describe as follows regarding an embodiment which covers the turning supporting portion 11 at the lower end portion of the turning shaft 1 from the upper side.

Figures 2A, 2B:
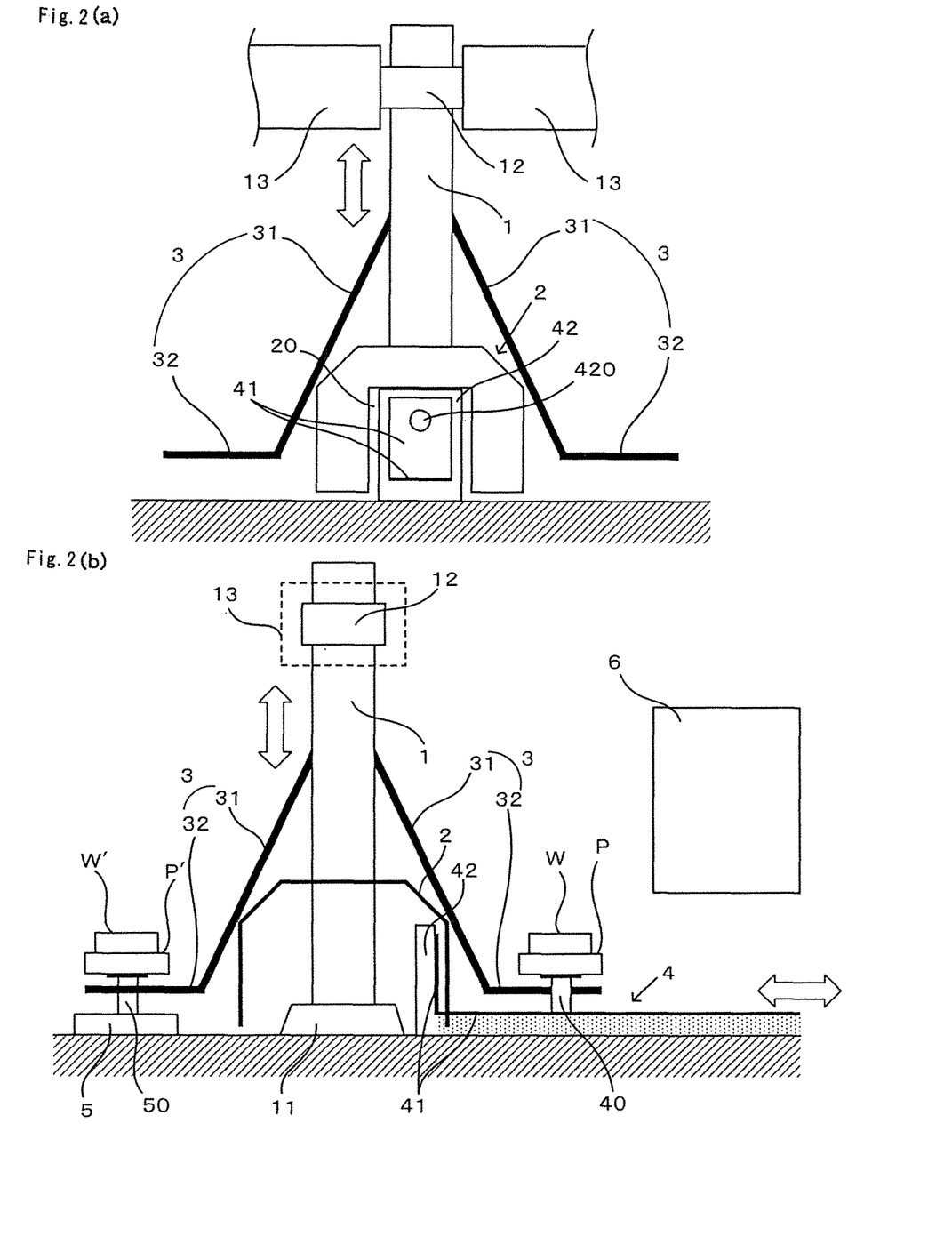
FIG. 2(a) shows a side sectional view thereof along a direction at which the table moves back and forth (a covering portion and pallet changing arms are shown by a sectional view and other constituents are shown by a side elevational view. Further, a patterned portion shows a region other than the rising portion and the pivoting portion of the table.).
FIG. 2(b) shows a front view of the covering portion on a side at which the insertion/removal hole is provided.

FIG. 2 (a), (b) each show the embodiment characterized in that, the turning shaft 1 firmly fixes the covering portion 2 which covers across the upper side of the turning supporting portion 11 positioned at a lower end side of the turning shaft 1, and the covering portion 2 equips the insertion and removal hole 20 which allows the rising portion 42 to be inserted and removed freely.

In the above-described embodiment, the rising portion 42 positioned at the leading end of the table 4 is inserted into the insertion and removal hole 20, by which, pallets P, P' arranged on the table 4 can be transferred in a state of being made close to the side of the turning shaft 1, although the covering portion 2 is interposed between the table 4 and the pallet setup base 5.

As a result, the compact pallet changing apparatus can be achieved, although the covering portion 2 is large in size, as shown in FIG. 2 (a), (b).

Figure 3A:
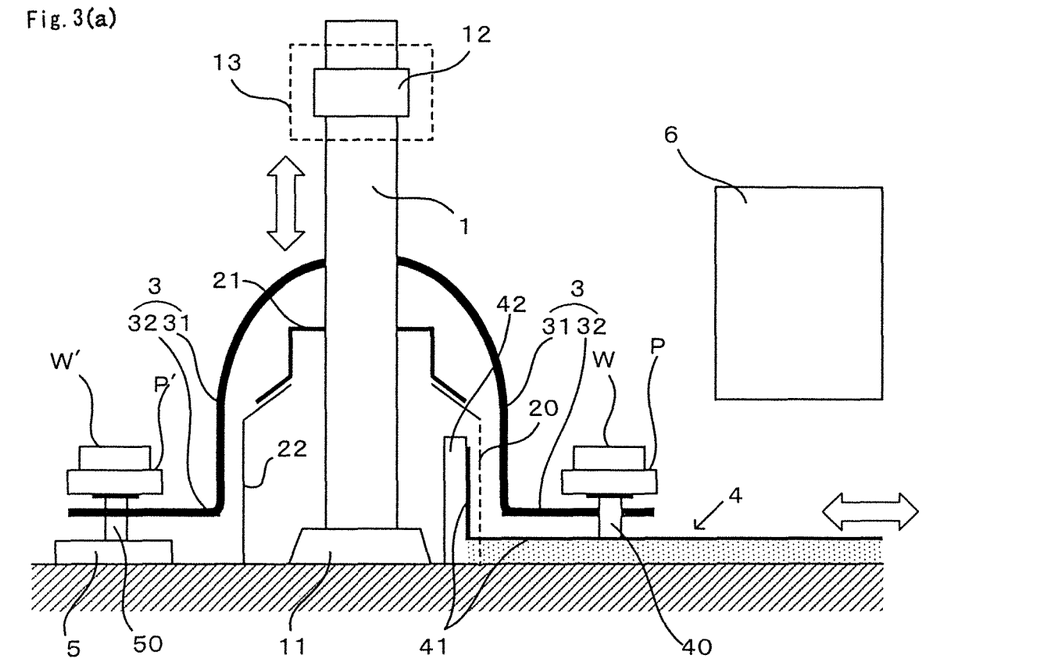
FIG. 3(a) shows a side sectional view thereof along a direction at which the table moves back and forth (the movable covering portion, the stationary covering portion and pallet changing arms are shown by a sectional view and other constituents are shown by a side elevational view. Further, a patterned portion shows a region other than the rising portion and a pivoting portion of the table.)
Figure 3B:
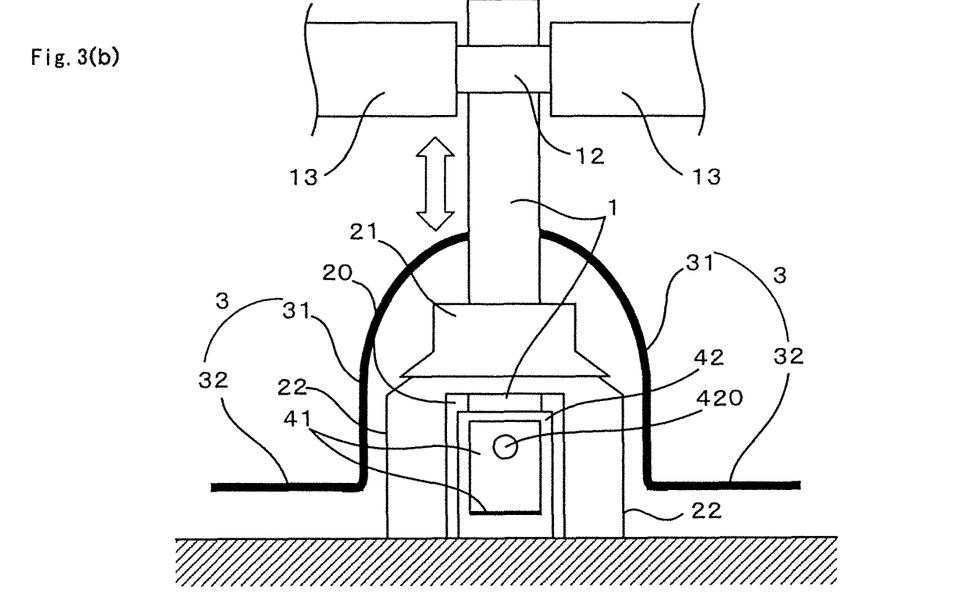
FIG. 3(b) shows a front view of the covering portion on a side at which the insertion and removal hole is provided.

FIG. 3 (a), (b) each show the embodiment characterized in that the turning shaft 1 firmly fixes the movable covering portion 21.

On the other hand, the stationary covering portion 22 covering across the upper side of the turning supporting portion 11 positioned at a lower end side of the turning shaft 1 is arranged below the movable covering portion 21, and the stationary covering portion 22 equips the insertion and removal hole 20 which allows the rising portion 42 to be inserted and removed freely.

In the above-described embodiment as well, the rising portion 42 positioned at the leading end of the table 4 is inserted into the insertion and removal hole 20, by which pallets P, P' placed on the table 4 can be transferred in a state of being close to the side of the turning shaft 1, although the stationary covering portion 22 is set up between the table 4 and the pallet setup base 5.

As a result, it is possible to achieve the compact pallet changing apparatus, although the movable covering portion 21 and the stationary covering portion 22 which are large in size are present, as shown in FIG. 3(a), (b).

In the above-described embodiment, it is possible to form a state that the movable covering portion 21 firmly fixed to the turning shaft 1 has a region which overlaps at least partially with the stationary covering portion 22 in a vertical direction. The reason for such configuration stands on preventing flying chips from entering into the turning supporting portion 11 by integration of the movable covering portion 21 with the stationary covering portion 22.

On the other hand, the insertion and removal hole 20 often allows not only the rising portion 42 but also the oscillating portion 41 and a certain region of the table 4 such as a lower region for supporting the oscillating portion 41 shown by a patterned region in FIG. 2(a) or FIG. 3(a) to be inserted and removed freely.

Figure 4A:
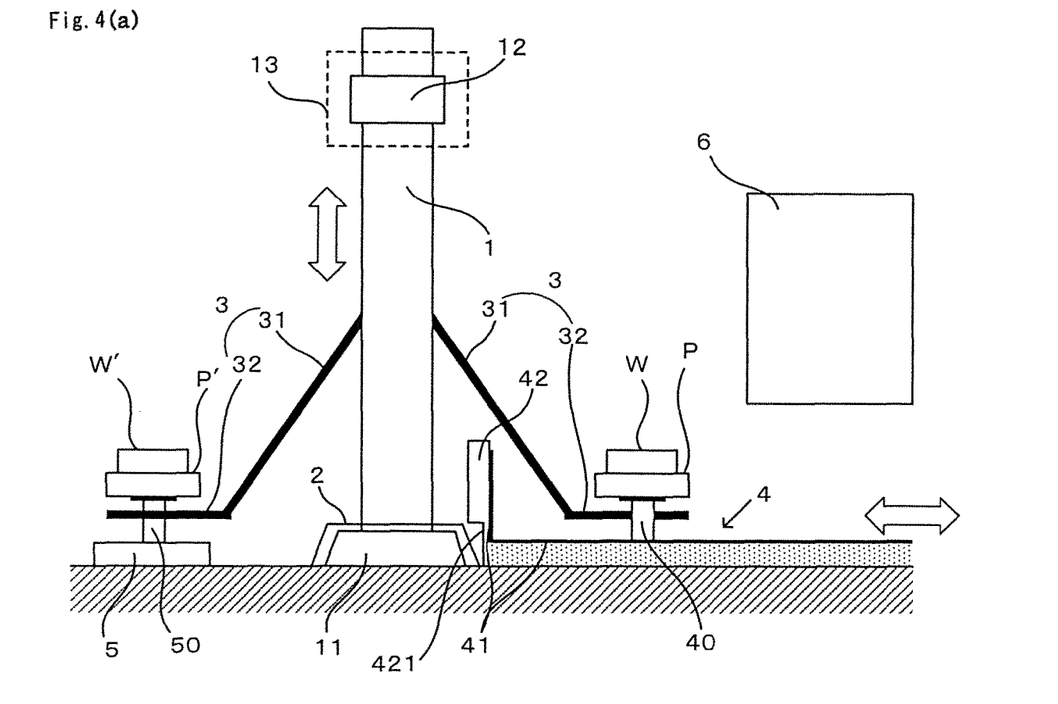
FIG. 4(a) shows a side sectional view thereof along a direction at which the table moves back and forth (the covering portion and pallet changing arms are shown by a sectional view, and other constituents are shown by a side elevational view. Further, a patterned portion shows a region other than the rising portion and the pivoting portion of the table.)
Figure 4B:
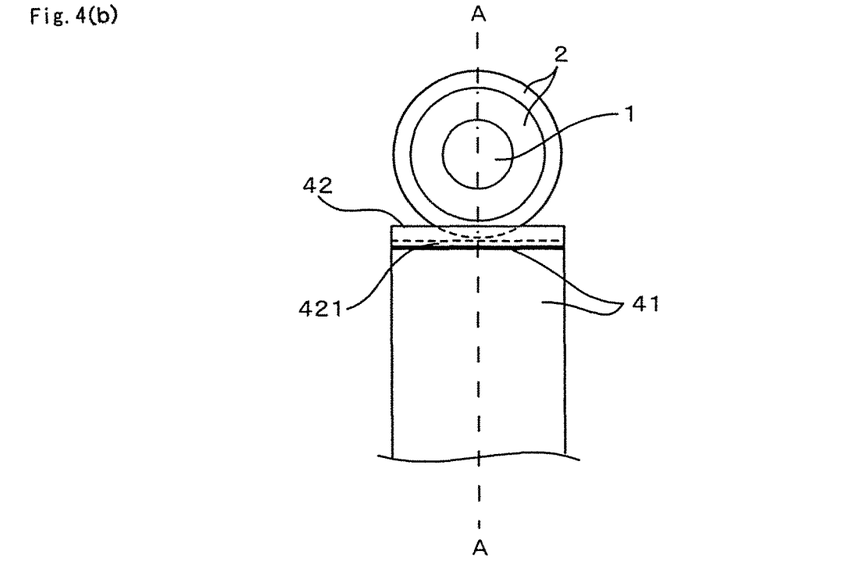
FIG. 4(b) shows a top view of the covering portion as well as the rising portion and a pivoting portion of the table (a circular-arc shaped dotted line shows a state that the covering portion is arranged below the rising portion and the lower supporting portion at a side of the rising portion).

FIG. 4(a), (b) each show the embodiment characterized in that the turning shaft 1 firmly fixes the covering portion 2 covering across the upper side of the turning supporting portion 11 positioned at a lower end side of the turning shaft 1, and the rising portion 42 and the lower supporting portion at the side of the rising portion 42 form a detached state from the covering portion 2 in a vertical direction and in a horizontal direction at a stage of the table 4 transferring the pallets P, P'.

In the above-described embodiment, at a stage that the table 4 transfers pallets P, P', such a state is achieved that the rising portion 42 and the lower supporting portion at the side of the rising portion 42 form the detached state from the covering portion 2 in a vertical direction and in a horizontal direction, according to such a state that the rising portion 42 can be close to the turning shaft 1 at the stage of the above-described transfer without hindering the turning of the covering portion 2. As a result, it is possible to achieve the compact pallet changing apparatus.

Further, the above-described embodiment does not need insertion of the rising portion 42 into the insertion and removal hole 20, although the rising portion 42 is inserted in the embodiment shown in FIG. 2(a), (b). Therefore, the covering portion 2 can be designed to be small to such an extent that exclusively covers the turning supporting portion 11.

Figure 5A:
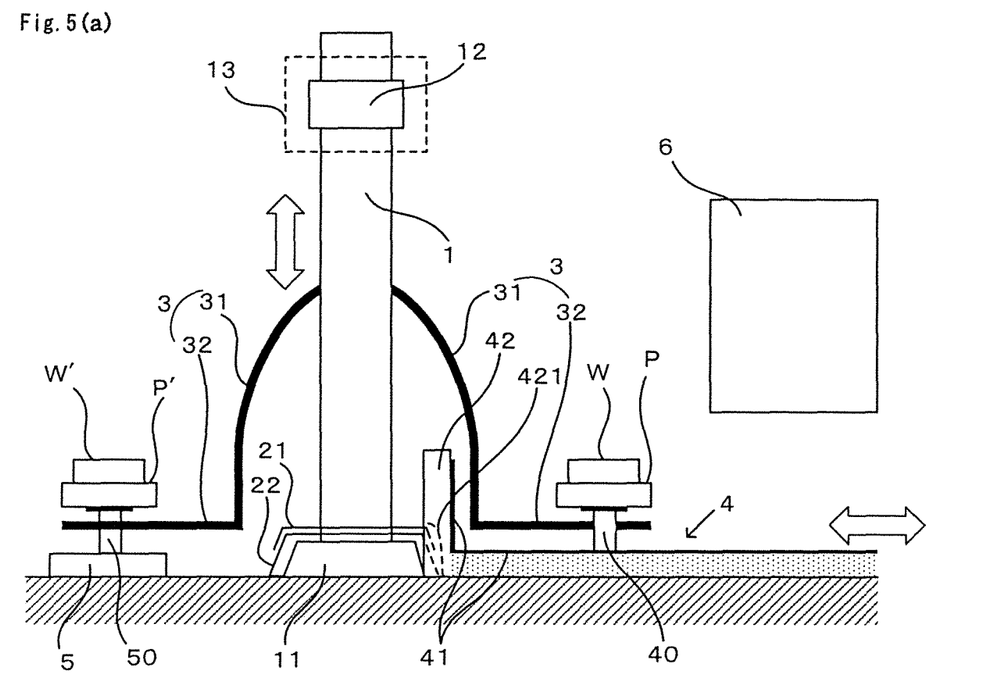
FIG. 5(a) shows a side sectional view thereof along a direction at which the table moves back and forth (the movable covering portion, the stationary covering portion and pallet changing arms are shown by a sectional view, and other constituents are shown by a side elevational view, and a patterned portion shows a region other than the rising portion and a oscillating portion of the table.).
Figure 5B:
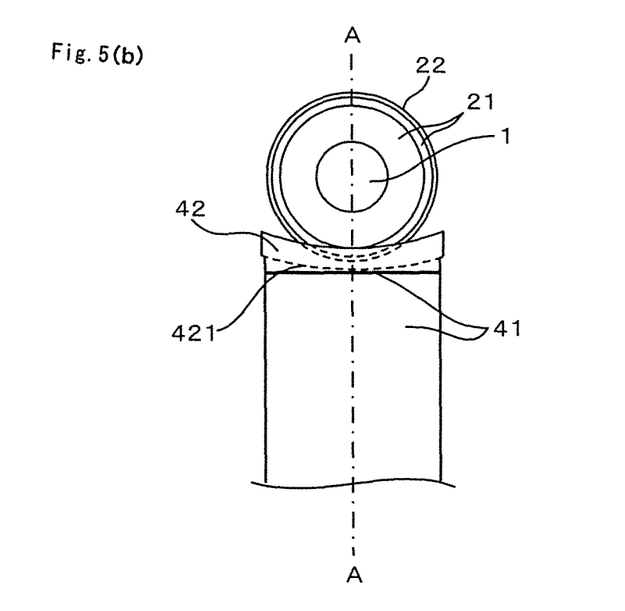
FIG. 5(b) shows a top view of the covering portion as well as the rising portion and the pivoting portion of the table (a circular-arc shaped dotted line shows a state that the movable covering portion and the stationary covering portion are arranged below the rising portion and the lower supporting portion in relation to the rising portion.).
Figure 6A:
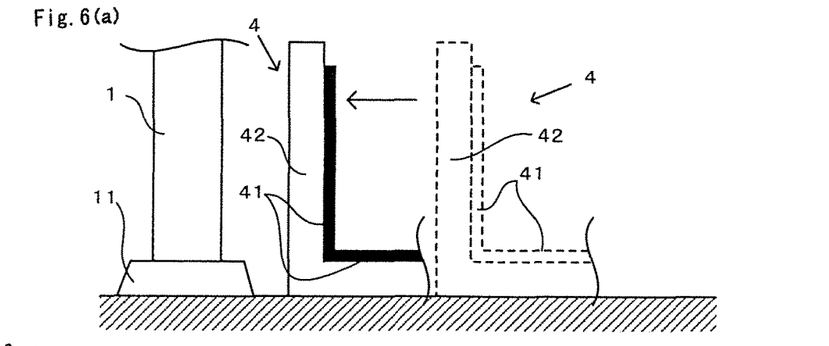
FIGS. 6(a)-6(g) are drawings which explain motions of the pallet changing apparatus of the basic configuration that shows steps covering the start of changing a pallet and up to completion thereof, as the first step in which the rising portion at the leading end of the table on the side of the turning shaft is moved to the turning shaft for transferring a pallet.
Figure 6B:
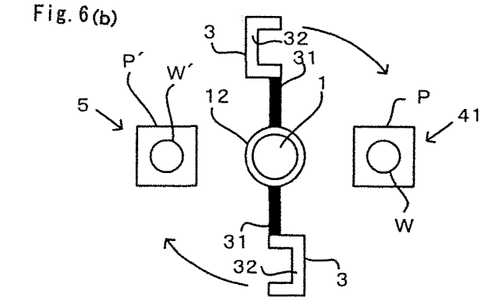
Figure 6C:
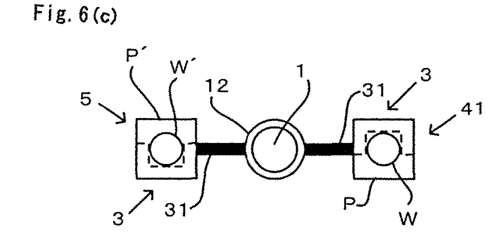
Figure 6D:
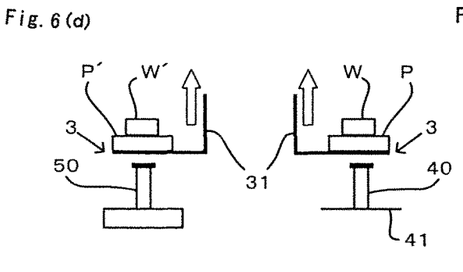
Figure 6E:
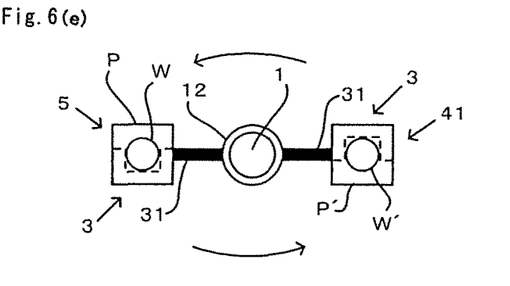
Figure 6F:
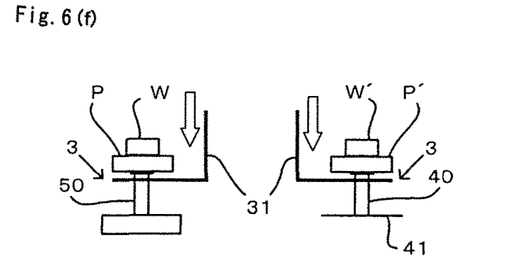
Figure 6G:
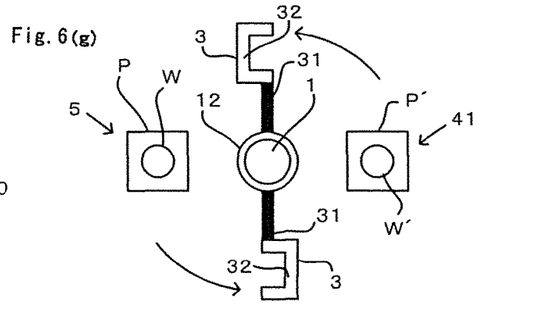

FIG. 5 (a), (b) each show the embodiment characterized in that the turning shaft 1 firmly fixes the movable covering portion 21.

On the other hand, the stationary covering portion 22 covering across the upper side of the turning supporting portion 11 positioned at a lower end side of the turning shaft 1 is arranged below the movable covering portion 21, and the rising portion 42 and the lower supporting portion at the side of the rising portion 42 each form a detached state from the movable covering portion 21 and the stationary covering portion 22 in a vertical direction and in a horizontal direction at a stage of the table 4 transferring pallets P, P'.

In the above-described embodiment as well, at a stage that the table 4 transfers pallets P, P', the rising portion 42 and the lower supporting portion at the side of the rising portion 42 form a detached state from the movable covering portion 21 and the stationary covering portion 22 in a vertical direction and in a horizontal direction. It is, therefore, possible to form a state that the rising portion 42 is close to the turning shaft 1 without an obstacle for turning of the movable covering portion 21, and as a result, it is possible to achieve the compact pallet changing arm 3.

Various shapes can be designed as a shape achieving the state described previously in the embodiment shown in FIG. 4(a), (b) in which the rising portion 42 and the lower supporting portion at the side of the rising portion 42 form a detached state from the covering portion 2 in a vertical direction and in a horizontal direction and as a shape achieving the state described previously in the embodiment shown in FIG. 5 (a), (b) in which the rising portion 42 and the lower supporting portion at the side of the rising portion 42 form a detached state from the movable covering portion 21 and the stationary covering portion 22 in a vertical direction and in a horizontal direction. In FIG. 4 (a), (b), it is possible to adapt a design characterized in that the lower supporting portion at the side of the rising portion 42 is formed in a reverse L-letter shape when viewed from a cross section thereof. In FIG. 5 (a), (b), it is possible to adapt a design characterized in that the lower supporting portion at the side of the rising portion 42 forms a curved surface whose radius value of curvature is larger than that of an outer surface of the covering portion 2 or outer surfaces of the movable covering portion 21 and the stationary covering portion 22 with a standard of a lower-end center position along the turning shaft 1.

In the embodiments shown in FIG. 2 and FIG. 4, the covering portion 2 covers the turning supporting portion 11 positioned at the lower end of the turning shaft 1, and does not contact with a floor surface as long as it integrally turns with the turning shaft 1.

However, since such a configuration is adopted that the lower end of the covering portion 2 is arranged so as to be lower than a position at which the pallet changing arm 3 is extended and also in the vicinity of a floor, the covering portion 2 is able to sufficiently perform functions of preventing chips from entering into the turning supporting portion 11.

In the embodiments shown in FIG. 3 and FIG. 5, since the stationary covering portion 22 is arranged on a floor surface below, thus making it possible to sufficiently prevent chips from entering into the turning supporting portion 11 positioned at a lower end side of the turning shaft 1.

Especially in the case of a configuration that the lower end side of the stationary covering portion 22 is firmly fixed on a floor, it is possible to completely prevent flying chips from entering thereinto.

Although it is essential that the turning shaft 1 turns together with the pallet changing arms 3 and also moves freely in a vertical direction, in order to achieve the above-described turning and vertical movement, as shown in FIG. 1(a), (b), FIG. 2 (a), (b), FIG. 3 (a), (b), FIG. 4(a) and FIG. 5(a), a driving portion 12 is connected to the turning shaft 1 and also firmly fixed to a floor surface or a wall portion. Thereby, the driving portion 12 is firmly fixed to a fixed frame 13 in a fixed state and able to drive the turning and the vertical movement.

In the basic configuration shown in FIG. 1 and the individual embodiments shown in FIGS. 2, 3, 4 and 5, after a first step of inserting the rising portion 42 of the table 4 and a partial region of the table 4 connected to the rising portion 42 into the insertion and removal hole 20, actions from beginning and until finishing of exchanging pallets P, P' may be achieved along the following processes as is shown in FIG. 6.

FIG. 6 is based on the embodiment in which the turning supporting portion 11 is not covered as shown in FIG. 1. However, the following processes will not be changed in the embodiment which is provided with the covering portion 2 as shown in FIG. 2 or 4 and in the embodiment which is provided with the movable covering portion 21 and the stationary covering portion 22 as shown in FIG. 3 or 5.

Process (a): Approaching the rising portion 42 of the table 4 to the turning shaft 1 (in the embodiment shown in FIG. 2 or FIG. 3, the rising portion 42 or a partial region of the table 4 connected to the rising portion 42 is inserted into the insertion and removal hole 20, and in the embodiment shown in FIG. 4 or FIG. 5, such a state is achieved that the rising portion 42 and the covering portion 2 of the lower supporting portion in relation to the rising portion 42 or the movable covering portion 21 and the stationary covering portion 22 are arranged so as to be away at a vertical direction and at a horizontal direction), Process (b): integral turning of the pallet changing arm 3 in a stand-by state together with the turning shaft 1, Process (c): movement of pallets P, P' supported by the supporting frame 40 in the oscillating portion 41 of the supporting portion of the pallet changing arm 3 and that of the pallets P, P' supported by the supporting frame 50 in the setup base 5 by downward turning, Process (d): upward movement of the turning shaft 1 with the pallet changing arms 3 supporting pallets P, P' (In the embodiment shown in FIG. 2 or FIG. 4, the turning shaft 1 and the covering portion 2 move upward, and in the embodiment shown in FIG. 3 or FIG. 5, the turning shaft 1 and the movable covering portion 21 move upward), Process (e): 180 degree-turning of the pallet changing arms 3 which support the pallets P, P', Process (f): downward movement of the turning shaft 1 with the pallet changing arms 3 which support pallets P, P' (In the embodiment shown in FIG. 2 or FIG. 4, the turning shaft 1 and the covering portion 2 move downward, and in the embodiment shown in FIG. 3 or FIG. 5, the turning shaft 1 and the movable covering portion 21 move downward) and placement of each of the pallets P, P' on the supporting frame 40 of the oscillating portion 41 and on the supporting frame 50 of the setup base 5, and Process (g): return to an original position by turning of the pallet changing arms 3.

As described above, the basic configuration shown in FIG. 1 and the embodiments shown in FIGS. 2, 3, 4 and 5 are able to smoothly change the pallets P, P' which respectively place workpieces W, W' by a series of turning and vertical movement.

Hereinafter, a description will be given with reference to the examples.

Example 1

Example 1 is characterized in that a door (not shown) for opening and closing the insertion and removal hole 20 is provided at the covering portion 2 of the embodiment shown in FIG. 2 (*a*), (*b*) and at the stationary covering portion 22 of the embodiment shown in FIG. 3 (*a*), (*b*).

Installation of the door makes it possible to prevent chips from entering into the turning supporting portion 11 by closing the door even after insertion of the rising portion 42 and a certain region of the table 4 through the insertion and removal hole 20.

With a consideration on a space necessary for opening and closing the door, a sliding door is more preferable than a revolving door.

Example 2

Example 2 is characterized in that in the basic configuration shown in FIG. 1 and in the individual embodiments shown in FIGS. 2, 3, 4 and 5, in which the rising portion 42 is arranged to exist at the vicinity of the surface of the turning shaft at the stage in which the rising portion 42 is set to be most close state to the turning shaft 1 to achieve that the table 4 transfers the pallet P.

In Example 2, the pallet changing arms 3 can be made shortest in length by arranging the rising portion 42 in the vicinity, thereby a compact pallet changing apparatus can be achieved.

INDUSTRIAL APPLICABILITY

As described so far, in the present invention in which the bridging extending portion which is extended from the turning shaft is arranged to cover across the upper side of the rising portion of the table at a stage the table transferring a pallet, the presence of the rising portion does not hinder turning of the pallet changing arm. Further, the present invention is remarkably innovative in achieving a compact pallet changing apparatus and can be used in all types of machine tools that require pallet change.

REFERENCE SIGNS LIST

1: Turning shaft
11: Turning supporting portion
12: Driving portion for turning shaft
13: Fixed frame
2: Covering portion
20: Insertion and removal hole
21: Movable covering portion
22: Stationary covering portion
3: Pallet changing arm
31: Bridging extending portion
32: pallet supporting portion
4: Table
40: Supporting frame for pallet arranged at oscillating portion
41: Oscillating portion of table
42: Rising portion of table
420: Oscillating center axis of rising portion
5: Setup base
50: Supporting frame for pallet arranged on setup base
6: Machine tool provided with main shaft, etc.
P, P': Pallet
W, W': Workpiece

The invention claimed is:

1. A pallet changing apparatus comprising:
   a pallet setup base,
   a table,
   pallet changing arms configured for simultaneously transferring pallets between a first supporting frame that is provided in the pallet setup base and a second supporting frame that is provided in the table,
   a turning shaft for supporting the pallet changing arms in a manner such that the turning shaft moves freely in a vertical direction but is stationary in a horizontal direction,
   wherein the table is configured to move back from and forth to a side of the turning shaft,
   the table including:
      an upright portion extending upwardly from and at a first end of a longitudinal direction of the table at a side of the table that is closest to the turning shaft, and
      an oscillating portion which is supported by the upright portion so as to oscillate freely about an oscillating center axis extending along the longitudinal direction of the table so as to position a workpiece via a given one of the pallets, which given one of the pallets is mountable to the oscillating portion,
   wherein the pallet changing arms extend on opposite sides of the turning shaft,
   wherein the pallet changing arms each include a respective pallet supporting portion having a longitudinal axis that extends horizontally, and a respective bridging extending portion that interfaces with the turning shaft to connect the turning shaft to the respective pallet supporting portion, each of the bridging extending portions having a longitudinal axis that forms an angle in a vertical plane with the longitudinal axes of the pallet supporting portions, the pallet changing arms being configured so that the pallet supporting portions are configured to simultaneously transfer the pallets between the first and second supporting frames, and
   the bridging extending portions form a covering over an uppermost face of the upright portion such that the uppermost face of the upright portion is covered by the bridging extending portion.

2. The pallet changing apparatus according to claim 1, further comprising:
   a turning shaft support positioned at a lower end side of the turning shaft, and a cover firmly fixed to the turning shaft and which covers an upper side of the turning shaft support, wherein the cover includes an insertion and removal hole which allows the upright portion to be inserted and removed freely therethrough.

3. The pallet changing apparatus according to claim 2, wherein the insertion and removal hole allows not only the upright portion but also a partial region of the table connected to the upright portion to be inserted freely into the insertion and removal hole and removed freely from the insertion and removal hole.

4. The pallet changing apparatus according to claim 3, further comprising a door for opening and closing the insertion and removal hole.

5. The pallet changing apparatus according to claim 2, further comprising a door for opening and closing the insertion and removal hole.

6. The pallet changing apparatus according to claim 1, further comprising:
   a movable cover firmly fixed to the turning shaft,
   a turning shaft support positioned at a lower end side of the turning shaft, and
   a stationary cover covering an upper side of the turning shaft support, the stationary cover being arranged below the movable cover and including an insertion and removal hole which allows the upright portion to be inserted and removed freely therethrough.

7. The pallet changing apparatus according to claim 6, wherein the insertion and removal hole allows not only the upright portion but also a partial region of the table connected to the upright portion to be inserted freely into the insertion and removal hole and removed freely from the insertion and removal hole.

8. The pallet changing apparatus according to claim 6, further comprising a door for opening and closing the insertion and removal hole.

9. The pallet changing apparatus according to claim 1, further comprising:
   a turning shaft support positioned at a lower end side of the turning shaft, and
   a cover firmly fixed to the turning shaft and covering an upper side of the turning shaft support, wherein
   the upright portion and a lower supporting portion of the table form a detached state from the cover in the vertical direction and in the horizontal direction at a stage of the table transferring the given one of the pallets, and
   the lower supporting portion, which is disposed at a side of the upright portion, forms a reverse L-shape when viewed from a cross-section thereof along the longitudinal direction of the table.

10. The pallet changing apparatus according to claim 1, further comprising:
    a movable cover firmly fixed to the turning shaft,
    a turning shaft support positioned at a lower end side of the turning shaft, and
    a stationary cover covering an upper side of the turning shaft support and arranged below the movable cover, wherein
    the upright portion and a lower supporting portion of the table form a detached state from the movable cover and the stationary cover in the vertical direction and in the horizontal direction at a stage of the table transferring the pallets, and
    the lower supporting portion, which is disposed at a side of the upright portion, forms a reverse L-shape when viewed from a cross-section thereof along the longitudinal direction of the table.

11. The pallet changing apparatus according to claim 1, wherein the upright portion is arranged adjacent the turning shaft during transfer of the pallets.

12. The pallet changing apparatus according to claim 1, further comprising:
    a turning shaft support positioned at a lower end side of the turning shaft,
    a cover firmly fixed to the turning shaft and which covers an upper side of the turning shaft support, and
    a lower supporting portion, the lower supporting portion being an element of the table and having a radius of curvature which is larger than a radius of curvature of the cover and which is formed one of:
        with a height greater than that of the cover such that the lower supporting portion is formed in a state out of contact with an outer, upper side of an outside surface of the cover,
        with a same height as the cover but separated from the outside surface of the cover in the horizontal direction along the oscillating center axis, wherein
    the upright portion and the lower supporting portion form a detached state from the cover in the vertical direction and in the horizontal direction at a stage of the table transferring the given one of the pallets.

13. The pallet changing apparatus according to claim 1, further comprising:
    a movable cover firmly fixed to the turning shaft,
    a turning shaft support positioned at a lower end side of the turning shaft,
    a stationary cover covering an upper side of the turning shaft support and which is arranged below the movable cover, and
    a lower supporting portion, the lower supporting portion being an element of the table and having a radius of curvature which is larger than a radius of curvature of the movable cover and the stationary cover and which is formed one of:
        with a height greater than that of the movable cover and the stationary cover such that the lower supporting portion is formed in a state out of contact with an outer, upper side of an outside surface of the movable cover and an outside surface of the stationary cover,
        with a same height as the movable cover and the stationary cover but separated from the respective outside surfaces of the movable cover and the stationary cover in the horizontal direction along the oscillating center axis, wherein
    the upright portion and the lower supporting portion form a detached state from the movable cover the stationary cover in the vertical direction and in the horizontal direction at a stage of the table transferring the given one of the pallets.

* * * * *